United States Patent [19]
Onda et al.

[11] 3,852,786
[45] Dec. 3, 1974

[54] SHUTTER ASSEMBLY HAVING MEANS FOR DAMPING THE RAPID MOTION OF THE SHUTTER BLADES

[75] Inventors: Eiichi Onda, Misato; Mitsuo Koyama; Tadashi Nakagawa, both of Chiba, all of Japan

[73] Assignee: Seiko Koki Kabushiki Kaisha, Tokyo, Japan

[22] Filed: Aug. 27, 1973

[21] Appl. No.: 391,521

[30] Foreign Application Priority Data
Aug. 25, 1972  Japan.............................. 47-98405

[52] U.S. Cl. .............................................. 354/252
[51] Int. Cl. ............................................ G03b 9/20
[58] Field of Search ........... 95/53 R, 55, 58, 59, 60; 354/252

[56] References Cited
UNITED STATES PATENTS

| | | | |
|---|---|---|---|
| 2,975,689 | 3/1961 | Chatani.................................. | 95/55 |
| 3,580,156 | 5/1971 | Loseries................................ | 95/60 |
| 3,628,438 | 12/1971 | Loseries................................ | 95/55 |
| 3,683,778 | 8/1972 | Weiss..................................... | 95/60 |

*Primary Examiner*—Samuel S. Matthews
*Assistant Examiner*—Russell E. Adams, Jr.
*Attorney, Agent, or Firm*—Robert E. Burns; Emmanuel J. Lobato; Bruce L. Adams

[57] ABSTRACT

A shutter assembly has a plurality of shutter blades divided in a shutter-opening blade group and a shutter-closing blade group. A shutter actuating mechanism independently actuates both groups of shutter blades to effect opening and closing of a shutter aperture and the actuating mechanism comprises a first set of generally parallel actuating levers connected to the shutter blades of the shutter-opening blade group by means of a pin-and-slot connection so that pivotal movement of the first set of actuating levers effects opening of the shutter aperture. A second set of generally parallel actuating levers is connected to the shutter blades of the shutter-closing blade group in a similar manner so that pivotal movement of the second set of actuating levers effects closing of the shutter aperture. A flexible spring plate having a series of protuberances thereon is disposed along the path of travel of the shutter blades such that as each blade group nears the end of its working stroke, the shutter blades collide with selected ones of the protuberances to effect flexing of the spring plate to cause movement of other ones of the protuberances into firm frictional engagement with the shutter blades thereby pressing them together to absorb the kinetic energy of the shutter blades and effectively dampen their rapid movement.

7 Claims, 5 Drawing Figures

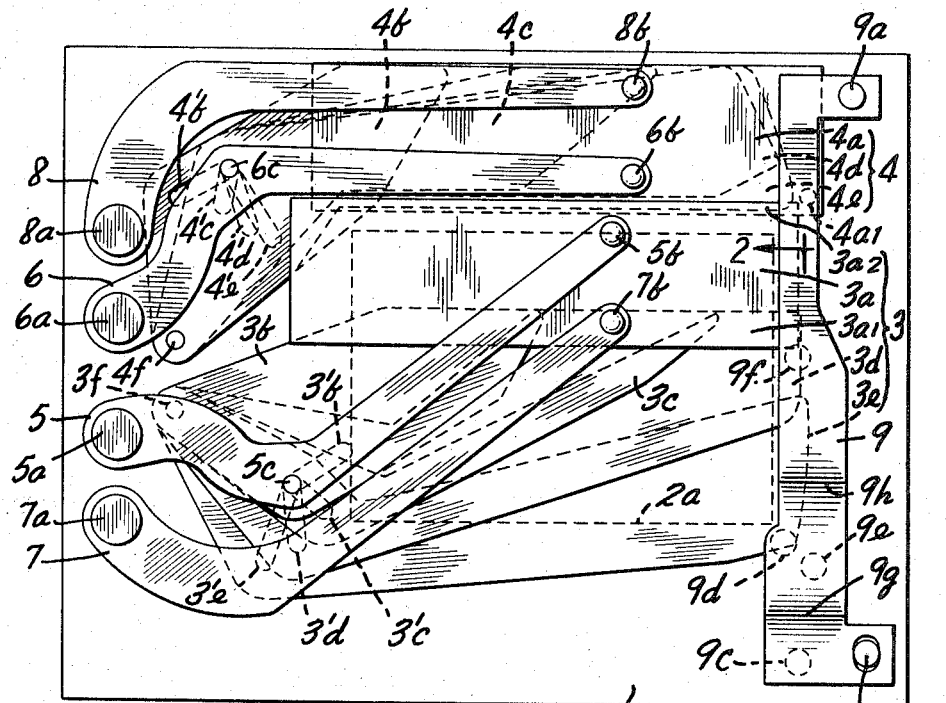
FIG. 1
FIG. 2
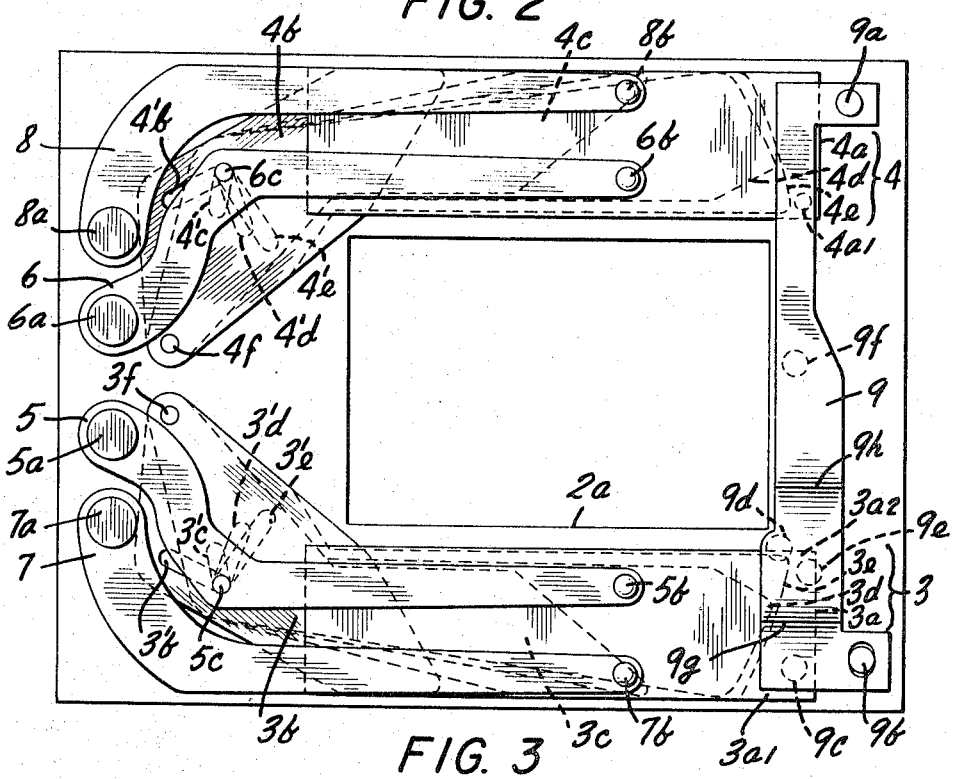
FIG. 3

SHUTTER ASSEMBLY HAVING MEANS FOR DAMPING THE RAPID MOTION OF THE SHUTTER BLADES

The present invention relates generally to camera shutters and more particularly relates to a focal plane shutter assembly having means for damping the high speed motion of the shutter blades during the taking of an exposure.

Cameras employing focal plane shutter assemblies are in wide use today and such cameras employ a plurality of shutter blades which are moveable to open and close a shutter aperture to effect an exposure. During the opening movement and the closing movement of the shutter blades, the blades move at high speed and it is necessary to completely stop the motion of the blades at a preselected stop position in order to obtain an accurate exposure. If the high speed motion of the shutter blades is not properly attenuated, the blades will continue past their intended stop position due to their inertia or rebound back from their stop position to again partially open the shutter aperture whereupon reexposure of the film occurs. The shock imparted to the shutter assembly by the rebounding action of the shutter blades detrimentally affects the operating life of the camera and the accuracy of the shutter assembly is severely lessened.

One technique that has heretofore been used to prevent occurence of such phenomena is to provide a narrow groove in which the shutter blades enter upon completion of their movement and the narrow groove engages with the shutter blades and stops them at the intended stop position by a wedging action. However this technique has not proven successful since additional space is needed to accommodate the grooved member and through the narrow groove effectively stops the shutter blades at the intended stop position, considerable energy must be expended to release the wedged shutter blades from the groove and thus a carefully calibrated device must be employed to supply the necessary torque to remove the wedged shutter blades from the groove. Moreover, a careful and delicate adjustment must be made to ensure the proper degree of wedging action between the shutter blades and the narrow groove.

Another technique which has been used is to position a fixed abutment member in the path of travel of the shutter blades in conjunction with a rebound prevention pawl for engaging with the shutter blades as they abut the abutment member thereby preventing their rebound movement. This technique is disadvantageous since considerable space is needed to house the abutment member and the pawl and thus it is not possible to reduce the size of the shutter assembly to that currently desired due to the present emphasis on smaller-sized compact cameras.

It is therefore a primary object of the present invention to provide a shutter assembly for a camera which has means for damping the high speed motion of the shutter blades as they near completion of both their opening and closing movement.

It is further object of the present invention to provide a shutter assembly for a camera which effectively overcomes the aforementioned problems and disadvantages of the prior art shutter assemblies.

It is yet another object of the present invention to provide a shutter assembly having a flexible spring plate disposed along the path of travel of the shutter blades for sequentially colliding with the shutter blades to initially dampen their motion and thereafter frictionally engaging with the shutter blades to completely dampen their motion during completion of both the shutter opening and closing operations.

The above and other objects of the present invention are carried out by a shutter assembly comprising a plurality of shutter blades divided into a shutter-opening blade group and a shutter-closing blade group. A shutter actuating means independently actuates both groups of shutter blades to effect opening and closing of a shutter aperture and the actuating means comprises a first set of generally parallel actuating levers connected to the shutter blades of the shutter-opening blade group by means of a pin-and-slot connection so that pivotal movement of the first set of actuating levers effects opening of the shutter aperture. A second set of generally parallel actuating levers is connected to the shutter blades of the shutter-closing blade group in a similar manner so that pivotal movement of the second set of actuating levers effects closing of the shutter aperture.

Damping means comprising a flexible spring plate containing a series of protuberances thereon is disposed along the path of travel of both blade groups and coacts therewith to dampen the high speed motion of the shutter blades at the completion of the shutter-opening and shutter-closing operations. The shutter blades collide with selected ones of the protuberances as the blades reach the end of their working stroke and the collision causes flexure of the spring plate to resiliently urge other ones of the protuberances against the blades thereby frictionally damping the motion.

Having in mind the above and other objects that will be evident from an understanding of this disclosure, the present invention comprises the combinations and arrangements of parts as illustrated in the presently preferred embodiment of the invention which is hereinafter set forth in sufficient detail to enable those persons skilled in the art to clearly understand the function, operation, construction and advantages of it when read in conjunction with the accompanying drawings, wherein like reference characters denote like parts in the various views, and wherein:

FIG. 1 is a plan view of the interior of a focal plane shutter assembly constructed in accordance with the principles of the invention and illustrating the shutter assembly in a cocked condition;

FIG. 2 is an enlarged cross-sectional view taken along section line 2—2 of FIG. 1;

FIG. 3 is a plan view of the interior of the focal plane shutter assembly shown in FIG. 1 and illustrating the shutter assembly in an open condition;

Figure 4:
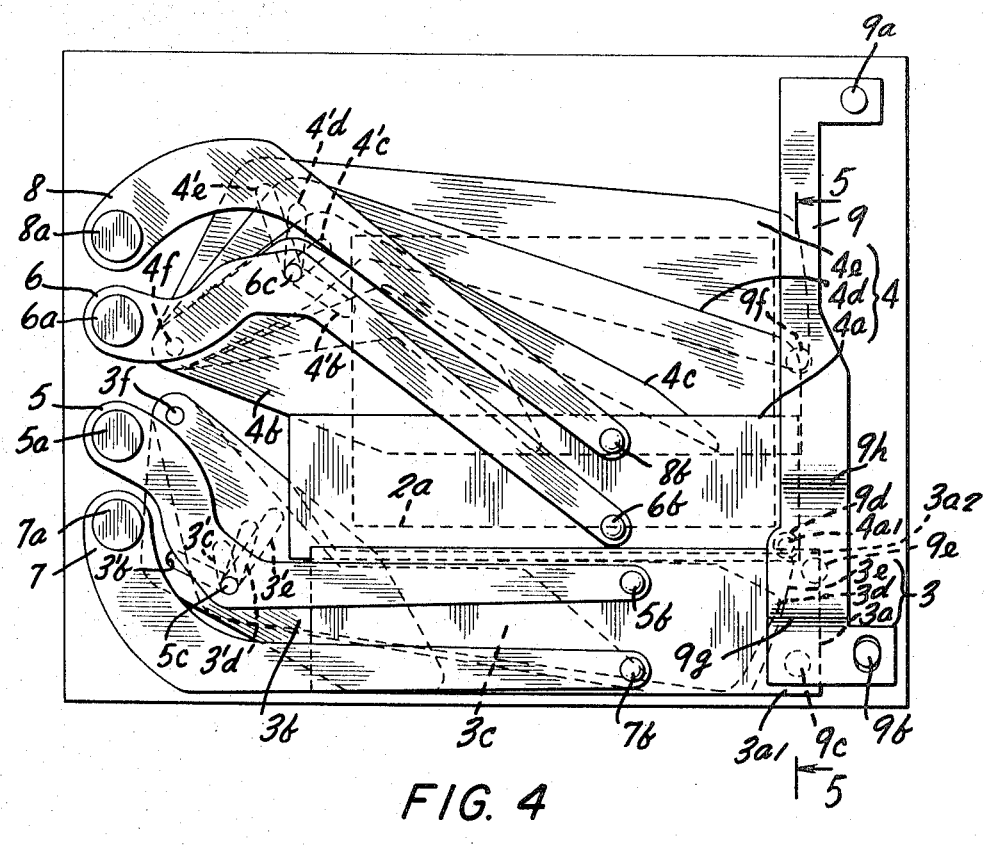
FIG. 4 is a plan view of the interior of the focal plane shutter assembly of FIG. 1 and illustrating the shutter assembly in a closed condition.

Referring now to the drawings, the focal plane shutter assembly comprises a base plate 1 constituting the major structural support member of the shutter assembly. The base plate is provided with a rectangular shutter aperture 20a which comprises a film exposure window and during use of the shutter assembly in a camera, film to be exposed in advanced behind the exposure window in a manner well known in the art.

The shutter assembly includes two groups of shutter blades 3 and 4 and the former group consists of shutter blades 3a, 3b, 3c, 3d and 3e and comprises a shutter-opening blade group whereas the latter group consists of shutter blades 4a, 4b, 4c, 4d and 4e and comprises a shutter-closing blade group. The shutter blade 3a of the shutter-opening blade group 3 has a rectangular configuration and comprises what is know in the art as a slit-forming shutter blade which coacts with the base plate 1 to effect opening of the rectangular shutter aperture 2a in the form of a progressively increasing rectangular slit and the remaining shutter blades in this group have a more or less segmented shape. In a similar manner, the shutter blade 4a of the shutter-closing blade group 4 comprises a slit-forming shutter blade which coacts with the base plate 1 to effect closing of the shutter aperture 2a in the form of a progressively decreasing rectangular slit and the remaining shutter blades 4b–4e have a segmented shape.

A shutter actuating means coacts with the shutter-blade groups to independently actuate them to effect sequential opening and closing of the shutter aperture 2a. The shutter actuating means comprises a set of opening actuating levers 5, 7 for actuating the shutter-opening blade group 3 and a set of closing actuating levers 6, 8 for actuating the shutter-closing blade group 4.

The opening actuating levers 5 and 7 comprise a primary actuating lever 5 mounted at one end for pivotal movement about a pin 5a, and an auxiliary actuating lever 7 mounted at one end for pivotal movement about a pin 7a, both of the pins 5a and 7a being affixed to the base plate 1. Pins 5b and 7b are provided at the other ends of the levers 5 and 7, respectively, and the slit-forming shutter blade 3a is pivotally connected to the pins 5b and 7b. By such an arrangement the actuating levers 5 and 7 are mounted for pivotal movement as a unit since the pivot points 5a, 7a and 5b, 7b are fixed relative to each other and thus the levers maintain a generally parallel disposition during their pivotal movement.

The primary actuating lever 5 has a driving pin 5c connected thereto and the driving pin slideably extends in elongated grooves 3'b, 3'c, 3'd and 3'e provided in respective ones of the segmented shutter blades 3b, 3c, 3d and 3e. The segmented shutter blades 3b–3e are arranged in superimposed stacked relationship and are all pivotally mounted about a fixed pivot pin 3f. The elongated slots 3'b–3'e have carefully selected lengths and directions which are chosen in relation to the shape and position of the segmented shutter blades 3b–3e so that pivotal movement of the actuating lever 5 in a clockwise direction in FIG. 1 will effect smooth opening of the shutter aperture 2a due to the combined effects of the pin-and-slot connections between the actuating lever 5 and the segmented blades 3b–3d and the pivotal connection of the actuating levers 5 and 7 with the slit-forming shutter blade 3a.

The shutter blades 3 have an extended position, as shown in FIG. 1 wherein the segmented blades 3b–3e are fanned out and coact with the slit-forming blade 3a to effectively close the shutter aperture 2a in a light-tight manner. The shutter blades 3 also have a retracted position, as shown in FIGS. 3 and 4, wherein the segmented shutter blades 3b–3e along with the slit-forming shutter blade 3a are retracted out of registry with the shutter opening 2a.

The shutter-closing blade group 4 and the closing actuating levers 6 and 8 assembly comprise a mirror image of the shutter-opening blade group 3 and the opening actuating levers 5 and 7 assembly. The blade group 4 consists of a slit-forming shutter blade 4a having a rectangular shape, and a plurality of segmented shutter blades 4b–4e.

The primary actuating lever 6 is pivotally mounted about a pin 6a affixed to the base plate 1 and the auxiliary actuating lever 8 is pivotally mounted upon a pin 8a also affixed to the base plate 1. A pin 6b is connected to an end portion of the primary actuating lever 6 and a pin 8b is connected to the end of the auxiliary actuating lever 8. The slit-forming blade 4a is pivotally connected to the pins 6b and 8b and by such a construction, the actuating levers 6 and 8 move as a unit and always retain the same relative positions with respect to each other. The segmented blades 4b–4e are all pivotally mounted about a pin 4f secured to the base plate 1 and these blades have elongated slots 4'b–4'e. A drive pin 6c is secured to the primary actuating lever 6 and slides within each of the grooves 4'b–4'e to form pin-and-slot connections therewith.

The shutter actuating means 5–8 is connectable to a drive mechanism contained in the camera during use of the shutter assembly to effect forward and return movement of the shutter blade groups to complete an exposure. Such a drive mechanism is well-known in the art and will not be further described here since such does not comprise part of the present invention. Suffice it to say, the drive mechanism includes a spring system for rapidly pivoting the opening actuating levers 5 and 7 in a clockwise direction in response to manual depression of a shutter release lever to effect opening of the shutter aperture and after a predetermined exposure time has elapsed, the spring system effects rapid clockwise turning of the closing actuating levers 6 and 8 to effect closing of the shutter aperture.

Figure 5:
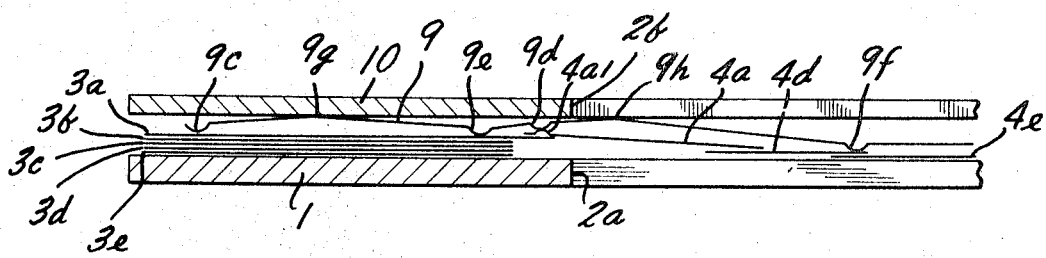
FIG. 5 is an enlarged cross-sectional view taken along section line 5—5 of FIG. 4.

In accordance with the present invention, the shutter assembly includes damping means for damping the high speed motion of the shutter blades as they near completion of their working stroke and for smoothly decelerating the rapid motion of the shutter blades to thereby prevent jarring impacts from being imparted to the shutter assembly as well as preventing reexposure of the film due to a partial reopening of the shutter aperture. The damping means comprises a flexible spring plate 9 disposal along the path of travel of the end tips of the shutter blades, and more particularly, along the path of travel of the slit-forming shutter blades 3a and 4a. The spring plate 9 overties the base plate 1 and is resiliently pressed against the shutter plates by a stationary press plate 10, as seen in FIGS. 2 and 5. The press plate 10 is provided with an opening 2b which is similar in shape to the shutter aperture 2a and the opening 2b is in registry with the shutter aperture 2a to permit unrestricted passage of light therethrough during the taking of an exposure.

The space between the base plate 1 and the press plate 10 is made as small as possible to provide a compact structure and the shutter blades and the shutter actuating means are housed within this space. A pair of mounting pins 9a and 9b extend between the plates 1 and 10 and the spring plate 9 is mounted on the pins in such a manner that the spring plate 9 is firmly attached at one end to the pin 9a but is loosely attached at the other end to the pin 9b by means of a pin-and-slot connection. By such a mounting, the spring plate 9 is displaceable in its lengthwise direction due to the pin-and-slot connection and therefore the spring plate 9 is mounted to undergo flexure in a transverse direction, i.e., into and out of the plane of paper in FIG. 1 and up and down in FIG. 2, as well be described in more detail hereinafter.

The spring plate 9 has a configuration, when viewed edge-wise, as shown in FIG. 2 and the plate 9 has two major blade-contacting sections, one for each blade group 3 and 4. The blade-contacting section associated with the blade group 3 comprises an arcuate portion $9g$ in engagement with the press plate 10, and two planar leg portions extending divergently outwardly from opposite sides of the arcuate portion $9g$ in a direction toward the base plate 1. A protuberance $9c$ is provided at the end of one leg portion and a protuberance $9e$ is provided at the end of the other leg portion, both protuberances projecting towards the base plate 1 and comprising depressions formed in the spring plate 9. In a similar manner, the blade-contacting section associated with the blade group 4 has an arcuate portion $9h$ in engagement with the press plate 10, and two planar leg portions extending divergently outwardly from opposite sides of the arcuate portion $9h$ and having near their respective ends protuberances $9d$ and $9f$.

The slit-forming shutter blade $3a$ has a leading edge portion or leading part $3a_1$ determined with respect to the direction of travel of the slit-forming blade during its shutter-opening working stroke, and a trailing edge portion $3a_2$. The protuberances $9c$ and $9d$ are disposed along the path of travel of the slit-forming shutter blade 3 so that during movement of the latter through its working stroke, the leading edge portion $3a_1$ will contact the protuberance $9c$ at a time when and at a location where the slit-forming blade has nearly completed its working stroke. The collision of the slit-forming blade $3a$ with the protuberance $9c$ resiliently flexes the spring plates 9 and forces the protuberance backwardly towards the press plate 10 and the leading edge portion $3a_1$ then rides over the protuberance. As protuberance $9c$ is flexed and moved backwardly, the entire blade-contacting section pivots about the arcuate portion $9g$ which serves as a fulcrum thereby moving the protuberance $9e$ forwardly towards the base plate 1.

As the protuberance $9e$ moves forwardly, it presses the trailing edge portion or succeeding part $3a_2$ firmly against the remaining shutter blades $3b$–$3e$ which are at this time stacked one above the other so that they are pressed against the base plate 1 thereby effectively damping the high speed motion of the shutter blades to prevent their rebounding back from their intended stop position. The kinetic energy of the rapidly moving shutter-opening blade group 3 is damped and attenuated by the energy expended in the initial collision of the leading edge portion $3a$ with the protuberance $9c$ and then in resiliently flexing the spring plate 9 and in frictional losses caused by the sliding rubbing motion of the shutter blades against themselves as well as against the base plate 1. The spring plate 9 effectively converts the energy of collision between the leading edge portion $3a_1$ and the protuberance $9c$ into a frictional force transmitted by the protuberance $9c$ against the trailing edge portion $3a_2$ to dampen the rapid motion of the shutter blades 3 at the completion of their working stroke.

In much the same manner, the slit-forming blade $4a$ has a leading edge portion or leading part $4a_1$ determined with respect to the direction of travel thereof during its shutter-closing working stroke, and a trailing edge portion only in this case, the trailing edge portion does not engage with the spring plate 9 but instead the succeeding trailing shutter blades $4d$ and $4e$ carry out this function. During closing of the shutter aperture, the leading edge portion $4a_1$ collides with the protuberance $9d$ as the slit-forming blade $4a$ nears completion of its working stroke thereby effecting pivotal movement of the entire blade-contacting section about the fulcrum $9h$ to urge the protuberance $9f$ into frictional contact with the segmented shutter blades $4d$ and $4e$ which trail after the slit-forming shutter blade $4a$. In order to provide adequate clearance between the protuberance $9c$ and the shutter-opening blade group 3, the protubernace is disposed out of the path of travel of the blade group 3, as seen in FIGS. 2 and 5, and therefore the leading edge portion $4a_1$ of the slit-forming shutter blade $4a$ has a projecting portion which projects towards the protuberance $9c$ to ensure collision between the two during the shutter-closing operation. By such an arrangement, the high speed motion of the shutter-closing blade group 4 is effectively damped at the completion of the shutter-closing operation.

A clearer understanding of the function and mode of operation of the damping means will now be described in conjunction with a description of the overall mode of operation of the shutter assembly in its cocked condition, the exposure aperture $2a$ is closed by the shutter-opening blade group 3 which is at this time in its extended state. The shutter-closing blade group 4 is in its retracted state and is cocked in readiness to close the shtter aperture.

When an exposure is to be taken, the camera release lever (not shown) is depressed and this action is transmitted through the drive mechanism (also not shown) to the shutter actuating means 5–8 thereby effecting clockwise pivotal movement of the opening actuating levers 5 and 7. The clockwise turning of the actuating levers 5 and 7 causes retraction of the shutter-opening blade group 3 from its extended state to its retracted state. The segmented shutter blades $3b$–$3e$ are thus driven about the pin $3f$ in a clockwise direction while the slit-forming blade $3a$ also moves in a clockwise direction but since the slit-forming shutter blade $3a$ is the trailing blade, the shutter aperture $2a$ is opened as a progressively increasing rectangular slit until the shutter aperture is completely opened as shown in FIG. 3.

As the shutter-opening blade group 3 approaches the end of the opening stroke, the leading edge portion $3a_1$ engages with the protuberance $9c$ which effects resilient flexure of the spring plate causing the protuberance $9e$ to move towards the base plate 1. More particularly, the leading edge portion $3a_1$ engages with and rides over the protuberance $9c$ resiliently flexing the spring plate and pivoting the protuberance $9e$ into frictional engagement with the trailing edge portion $3a_2$ and as the protuberance $9e$ moves in this manner, the individual shutterblades $3a$–$3e$ are pressed between the flexed spring plate 9 and the base plate 1. The collision of the leading edge portion $3a_1$ with the protuberance $9c$ followed by the frictional engagement of the trailing edge portion $3a_1$ with the protuberance $9e$ effectively decelerates the rapid opening motion of the shutter-opening blade group 3 and this action is supplemented by the frictional engagement occuring between the individual blades as they are pressed together as well as against the base plate 1. Most of the kinetic energy of the rapidly moving shutter blades is absorbed by the combined effects of the elastic collision between the leading edge portion $3a_1$ and the protuberance $9c$ and the resilient flexure of the spring plate 9 causing the pressing of the shutter blades against the base plate 1 by the action of the protuberance $9e$ pressing against the trailing edge portion $3a_2$ and thus the high speed opening motion of the shutter blades is effectively damped and attenuated.

After the elapsing of the desired exposure time, the shutter actuating means effects clockwise movement of the shutter-closing blade group 4 to effect closing of the shutter aperture $2a$. The drive mechanism (not shown) effects clockwise turing of the closing actuating levers 6 and 8 thereby effecting corresponding clockwise pivotal movement of the shutter blades $4a$–$4e$. In this case, the slit-forming shutter blade $4a$ is the leading shutter blade and moves downwardly over the shutter aperture to form a progressively decreasing rectangular slit and the clockwise motion of the shutter blade group 4 is continued until the blade group reaches its fully extended position as shown in FIG. 4. The segmented shutter blades $4b$–$4e$ fan out and coact with the slit-forming shutter blade $4a$ to reclose the shutter aperture $2a$ in a light-tight manner thereby terminating the exposure.

As the slit-forming blade $4a$ nears the end of its working stroke, the leading edge protion $4a_1$ collides with the protuberance $9d$. As the shutter blade $4a$ rides over the protuberance $9d$, the spring plate 9 is flexed and pivots the protuberance $9f$ into frictional engagement with the succeeding shutter blades $4d$ and $4e$, as shown in FIG. 4, and the individual shutter blades $4a$–$4e$ are resiliently pressed against the base plate 1. In this manner, the kinetic energy of the shutter-closing blade group 4 is effectively damped and dissipated so that no harmful rebounding of the shutter blade occurs.

In the above embodiment, a single spring plate is employed to dampen the motion of both the shutter-opening blade group 3 and the shutter-closing blade group 4 but it is possible to use two separate spring plates. Moreover, additional protuberances can be provided on the spring plate and arranged to contact different ones of the shutter blades. The spring plate 9 may also be arranged so as to continuously bias the shutter blades within each group towards base plate 1 thereby enhancing the light-tightness between adjacent shutter blades.

Thus it may be seen that the shutter assembly of the invention uses the kinetic energy posssessed by the rapidly moving leading parts of each blade group to initiate the damping action of the succeeding parts. Since the leading parts collide with and then rids over flexible members, the detrimental shock which normally occurs in shutter assemblies which employ collisions with rigid members is avoided and the shock energy is dissipated in flexing of the spring plate and in damping the motion of the succeeding parts so that the motion of the leading parts is not impeded.

The shutter assembly of the invention effectively dampens and attenuates the high speed motion of the shutter blade groups during opening and closing of the shutter aperture and such is accomplished by using only a minimum of additional parts. The shutter assembly constructed in accordance with the invention may be made extremely small in size and is extremely rugged and durable.

The invention has been described in conjunction with one particular embodiment and it is to be understood that obvious modifications and changes may be made without departing from the spirit and scope of the invention as defined in the appended claims.

What we claim is:

1. A shutter assembly for a camera comprising: means defining a shutter aperture; a plurality of actuatable shutter blades comprising a first group of shutter-opening shutter blades actuatable through a working stroke from an extended position wherein they close said shutter aperture to a retracted position wherein they open said shutter aperture, and a second group of shutter-closing shutter blades actuatable through a working stroke from a retracted position wherein they open said shutter aperture to an extended position wherein they close said shutter aperture; shutter actuating means for sequentially actuating the first and second shutter blade groups through their respective working strokes to effect first opening and then closing of said shutter aperture thereby defining an exposure; and damping means disposed along the path of travel of both groups of the shutter blades and having first means responsive to engagement by a leading part of each gruop of said shutter blades past a given location corresponding to when said shutter blades have parts thereof overlying each other near completion of their working stroke and having second means for engaging with a succeeding part of said shutter blades in response to said engagement of said first means and said leading part to thereby effectively dampen the motion of each group of shutter blades and press the overlying parts of said shutter blades together.

2. A shutter assembly according to claim 1; wherein said damping means includes a resiliently flexible member disposed along the path of travel of said shutter blades and said first means comprises one portion thereof disposed to make sliding engagement with said leading part of said shutter blades and responsive to said sliding engagement for resiliently urging another portion comprising said second means thereof into frictional engagement with said succeeding part of said shutter blades.

3. A shutter assembly according to claim 2; wherein said resiliently flexible member comprises a spring plate.

4. A shutter assembly according to claim 2; wherein said one and another portions each comprise a protuberance projecting outwardly towards said shutter blades.

5. A shutter assembly according to claim 2; wherein said damping means includes a stationary press plate overlying said flexible member, a stationary base plate disposed in spaced relationship from said press plate and defining therebetween a space in which said shutter blade groups are housed to undergo movement through their working strokes, said flexible member being mounted within said space and having an arcuate portion in contact with said press plate and two leg portions extending divergently outwardly from said arcuate portion, said one and another portions of said flexible member being located along respective ones of said leg portions and disposed for engaging said shutter blades during movement thereof through their working stroke, and means mounting said flexible member in said space to undergo flexure in response to movement of said leading part of said shutter blades into sliding frictional engagement with said one portion of said flexible member to effect pivotal movement of said flexible member about said arcuate portion to resiliently urge said another portion of said flexible member into sliding frictional engagement with said succeeding part of said shutter blades to thereby press said shutter blades frictionally together and frictionally against said base plate, and to improve the light-tightness of the groups of blades.

6. A shutter assembly according to claim 5; wherein said one and another portions of said flexible member each comprise a resilient protuberance projecting outwardly towards said shutter blades to make slideable frictional engagement therewith during movement of said shutter blades through their working stroke.

7. A shutter assembly according to claim 2; wherein said flexible member has arcuate portions engageable with each of said shutter blade groups to attenuate and dampen the motion of the corresponding shutter blade during both opening and closing of said shutter aperture.

* * * * *